United States Patent
Hagiwara et al.

(10) Patent No.: US 11,313,422 B2
(45) Date of Patent: Apr. 26, 2022

(54) ELECTRIC DISC BRAKE

(71) Applicant: Hitachi Automotive Systems, Ltd., Hitachinaka (JP)

(72) Inventors: Takayuki Hagiwara, Tokyo (JP); Atsushi Odaira, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 257 days.

(21) Appl. No.: 16/647,553

(22) PCT Filed: Jun. 18, 2018

(86) PCT No.: PCT/JP2018/023056
§ 371 (c)(1),
(2) Date: Mar. 16, 2020

(87) PCT Pub. No.: WO2019/064727
PCT Pub. Date: Apr. 4, 2019

(65) Prior Publication Data
US 2020/0278000 A1    Sep. 3, 2020

(30) Foreign Application Priority Data

Sep. 29, 2017    (JP) .............................. JP2017-190404

(51) Int. Cl.
*F16D 55/22*    (2006.01)
*F16D 55/226*    (2006.01)
(Continued)

(52) U.S. Cl.
CPC ........... *F16D 55/226* (2013.01); *F16D 13/52* (2013.01); *F16D 65/183* (2013.01);
(Continued)

(58) Field of Classification Search
CPC ...... F16D 13/52; F16D 55/226; F16D 65/183; F16D 2055/0029; F16D 2121/24;
(Continued)

(56) References Cited

U.S. PATENT DOCUMENTS 4,491,203 A * 1/1985 Monick ................. F16D 65/567
188/196 BA
2003/0136616 A1* 7/2003 Hageman ................ F16D 65/18
188/73.31

(Continued)

FOREIGN PATENT DOCUMENTS

DE     199 22 333 A1    11/2000
DE  10 2006 033 333 A1    8/2007
(Continued)

OTHER PUBLICATIONS

International Search Report (PCT/ISA/210) issued in PCT Application No. PCT/JP2018/023056 dated Sep. 4, 2018 with English translation (three pages).
Japanese-language Written Opinion (PCT/ISA/237) issued in PCT Application No. PCT/JP2018/023056 dated Sep. 4, 2018 (four pages).
(Continued)

*Primary Examiner* — Nicholas J Lane
(74) *Attorney, Agent, or Firm* — Crowell & Moring LLP

(57) ABSTRACT

An object of the present invention is to provide an electric disc brake suitable for improving responsiveness. The electric disc brake includes: a rotation linear motion conversion mechanism configured to convert rotational motion of the rotary member into linear motion; a return spring configured to store torque for retreating the piston according to rotation of a rotary member; and a clutch configured to make a transition between a state in which the torque is able to be stored in the return spring and a state in which storage of the torque in the return spring is deterred. The clutch includes: a first disc and a third disc configured to rotate together with the rotary member, and a second disc disposed between the first disc and the third disc. The return spring has one end portion coupled to the caliper body and another end portion coupled to the second disc.

10 Claims, 5 Drawing Sheets

(51) Int. Cl.
   *F16D 13/52* (2006.01)
   *F16D 65/18* (2006.01)
   *F16H 25/22* (2006.01)
   *B60T 13/74* (2006.01)
   *F16D 121/24* (2012.01)
   *F16D 125/40* (2012.01)
   *F16D 127/02* (2012.01)
   *F16H 25/20* (2006.01)
   *F16D 55/00* (2006.01)

(52) U.S. Cl.
   CPC ........ *F16H 25/2204* (2013.01); *B60T 13/746* (2013.01); *F16D 2055/0029* (2013.01); *F16D 2121/24* (2013.01); *F16D 2125/40* (2013.01); *F16D 2127/02* (2013.01); *F16H 2025/2081* (2013.01)

(58) Field of Classification Search
   CPC ............. F16D 2125/40; F16D 2127/02; B60T 13/741; B60T 13/746
   See application file for complete search history.

(56) References Cited

U.S. PATENT DOCUMENTS

| | | | |
|---|---|---|---|
| 2017/0314627 A1* | 11/2017 | Hyun | F16D 65/18 |
| 2019/0322265 A1* | 10/2019 | Tsukamoto | B60T 17/221 |
| 2020/0049217 A1* | 2/2020 | Bai | F16D 37/02 |
| 2020/0217379 A1* | 7/2020 | Odaira | B60T 13/74 |
| 2020/0240484 A1* | 7/2020 | Hur | F16D 67/02 |
| 2020/0240485 A1* | 7/2020 | Nanahara | F16D 65/183 |

FOREIGN PATENT DOCUMENTS

| | | |
|---|---|---|
| DE | 10 2016 221 904 A1 | 11/2017 |
| JP | 8-72702 A | 3/1996 |
| JP | 2009-127737 A | 6/2009 |
| JP | 2013-24389 A | 2/2013 |

OTHER PUBLICATIONS

German-language Office Action issued in German Application No. 11 2018 004 232.4 dated Jun. 17, 2021 with partial English translation (18 pages).

* cited by examiner

ELECTRIC DISC BRAKE

TECHNICAL FIELD

The present invention relates to an electric disc brake that generates a braking force by torque of an electric motor.

BACKGROUND ART

The summary of JP 2009-127737 A (PTL 1) describes an electric disc brake having a fail-open function. The electric disc brake in PTL 1 includes two discs that rotate differentially according to the rotation of the rotating shaft (eccentric shaft), and a torsion spring (return spring) that stores torque according to the relative rotation of both discs, and includes a planetary gear reduction mechanism that decelerates the rotation of the electric motor and transmits it to the ball screw mechanism (rotation linear motion conversion mechanism). One disc is coupled to the screw shaft of the ball screw mechanism, and the other disc is coupled to the motor case via a friction clutch. The electric disc brake in PTL 1, at the initial stage of braking, rotates both discs integrally and moves forward the piston at a reduction ratio of 1 to quickly eliminate the pad clearance; at the stage where braking force is generated, stops the rotation of the other disc with the friction clutch and moves the piston forward at a predetermined reduction ratio to store torque in the torsion spring; and at the time of the electric motor failure, returns the piston using the torque stored in the torsion spring.

CITATION LIST

Patent Literature

PTL 1: JP 2009-127737 A

SUMMARY OF INVENTION

Technical Problem

In the electric disc brake in PTL 1, the torsion spring (return spring) is interposed between a pair of rotary members (discs), the first rotary member is coupled to the rotary member of the ball screw mechanism (rotation linear motion conversion mechanism) to rotate integrally, and the second rotary member is rotatably attached to the caliper body (motor case). In this configuration, the return spring rotates together with the rotary member of the rotation linear motion conversion mechanism until the brake pad comes into contact with the brake disc. Therefore, the weight of the return spring functions as a rotational load until the brake is started, and there is a limit to improving the responsiveness of the electric disc brake.

An object of the present invention is to provide an electric disc brake suitable for improving responsiveness.

Solution to Problem

In order to solve the above problems, an electric disc brake according to the present invention includes:
an electric motor;
a speed reducer configured to amplify rotary torque of the electric motor;
a rotation linear motion conversion mechanism including a rotary member configured to rotate in response to rotational motion of the speed reducer, the rotation linear motion conversion mechanism configured to convert rotational motion of the rotary member into linear motion;
a caliper body including a cylinder;
a piston configured to be inserted into the cylinder, the piston configured to move forward to press a brake pad against a brake disc;
a return spring configured to store torque for retreating the piston according to rotation of a rotary member of the rotation linear motion conversion mechanism; and
a clutch configured to make a transition between a state in which the torque is able to be stored in the return spring and a state in which storage of the torque in the return spring is deterred. The clutch includes: a first disc and a third disc arranged side by side in a direction along a rotation center line of the rotary member, the first disc and the third disc configured to rotate together with the rotary member, and a second disc having a first facing surface facing the first disc and a second facing surface facing the third disc, the second disc disposed between the first disc and the third disc. The return spring has one end portion coupled to the second disc and another end portion coupled to the caliper body.

Advantageous Effects of Invention

According to the present invention, the weight of the return spring of the electric disc brake is not a rotational load, and the responsiveness at the time of brake start can be improved.

DESCRIPTION OF EMBODIMENTS

The electric disc brake 100 according to the present invention includes a mechanism that generates a braking force with the torque of the electric motor and releases the braking force when a power failure occurs in the brake operating state.

First Embodiment

Figure 1:
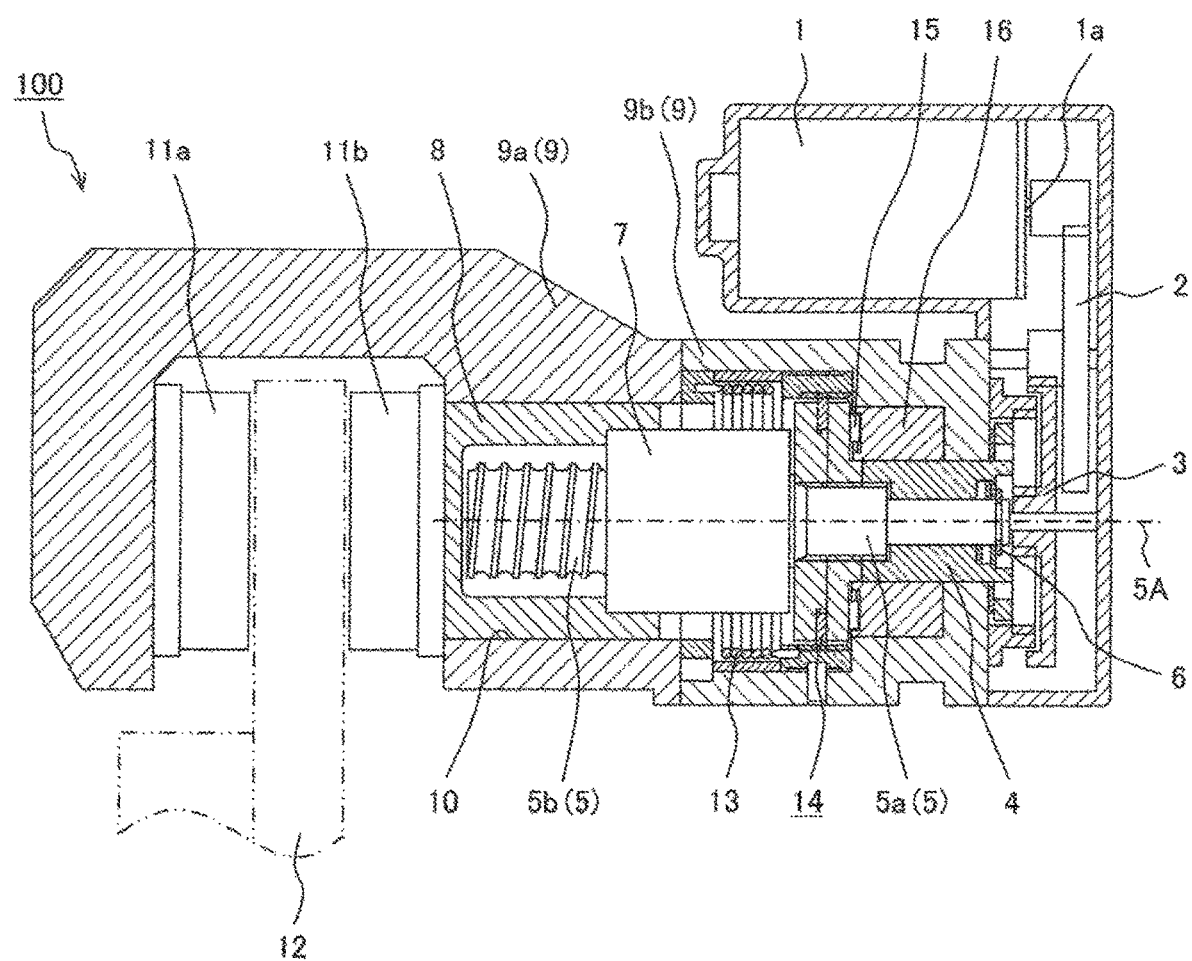
FIG. 1 is a cross-sectional view showing the structure of an electric disc brake according to a first embodiment of the present invention.

FIG. 1 is a cross-sectional view showing the structure of an electric disc brake according to a first embodiment of the present invention.

The electric motor 1 is controlled by an electronic control unit (not shown), and the output shaft 1a of the electric motor 1 is connected to a reduction gear (speed reducer) 2. The reduction gear 2 constitutes a planetary gear 3, and the carrier 4 of the planetary gear 3 is splined to a spline 60 provided on the spindle 5 (also referred to as spline fitting). A C clip 6 is provided at the end portion of the spindle 5, and the position of the spindle 5 in the direction along the rotation center line 5A is fixed by the C clip 6. The rotation center line 5A is the rotation center line of the spindle 5.

The spindle 5 includes a spline shaft (first spline shaft) 5a and a screw shaft 5b of the ball screw. A helical groove 5ba having a helical shape is formed along the rotation center line 5A on the outer peripheral surface of the screw shaft 5b. The ball screw includes a screw shaft 5b, a nut 7, and a ball 53. The nut 7 has a cylindrical shape, and a helical groove 7a is formed on the inner peripheral surface. A plurality of balls 53 are arranged between the helical groove 5ba of the screw shaft 5b and the helical groove 7a of the nut 7. In the ball screw 5b, 7, the rotation of the nut 7 is restricted by the caliper body 9, and the rotational motion of the spindle 5 is converted into the linear motion of the nut 7. At this time, the ball 53 moves between the helical groove 5ba of the screw shaft 5b and the helical groove 7a of the nut 7 while rotating. It should be noted that the ball screw 5b, 7, 53 may be referred to as a ball screw mechanism.

The rotation linear motion conversion mechanism according to the embodiment of the present invention includes a spindle 5, a nut 7, and a ball 53. The spindle 5 constitutes a rotary member of a rotation linear motion conversion mechanism, the rotary member for rotating in response to the rotational motion of the reduction gear (speed reducer) 2. The rotation linear motion conversion mechanism of the present embodiment includes a spindle 5 for constituting a rotary member, and a nut 7 whose rotation with respect to the caliper body 9 is restricted, and the rotation of the spindle 5 moves the nut 7 in the direction along the rotation center line 5A to move the piston 8 forward and backward.

The nut 7 for linearly moving is structured to push the piston 8 connected to the nut 7. The piston 8 is inserted into the cylinder 10 of the caliper body 9a in a state where rotation is restricted. Rotation of the nut 7 with respect to the caliper body 9 is restricted via the piston 8.

When the brake is applied, the rotary torque of the electric motor 1 is increased by the reduction gear 2 and the planetary gear 3, and the spindle 5 is turned. When the spindle 5 rotates in the forward direction, the nut 7 advances in the left direction in the figure and pushes the piston 8 toward the brake disc 12. Thus, the brake pad 11b is pressed against the brake disc 12 by the advance of the piston 8. As a result, in the brake disc 12, a disc surface on the opposite side of the side against which the brake pad 11b is pressed is pressed against the brake pad 11a, and a braking force is generated with the brake disc 12 sandwiched between the brake pad 11a and the brake pad 11b.

The forward direction of the piston 8 is a direction in which the piston 8 advances in the left direction in the drawing along the rotation center line 5A (direction of approaching the brake disc 12). In addition, the retreat direction of the piston 8 is a direction in which the piston 8 advances in the right direction in the drawing along the rotation center line 5A (direction away from the brake disc 12).

When the power fails, the piston 8 is pushed back by the reaction force received from the brake disc 12 to release the brake. On the premise that failure due to this power failure occurs at one of the four wheels, in order to prevent heat generation and tire lock due to continued running, it is necessary to keep the piston 8 returned until the braking force reaches not more than a predetermined level. However, in order to deal with a small-sized electric motor 1 with small torque, it is necessary to set a high reduction ratio between the reduction gear 2 and the planetary gear 3. In this case, since the reduction ratio is high, when viewed from the side of pushing back the piston 8, the friction torque of the electric motor 1 at the time of failure is increased and the piston 8 becomes difficult to return. In order to solve this, the electric disc brake of the present embodiment includes a return spring 13 that stores a force for pushing back the piston 8. In the present embodiment, the return spring 13 includes a torsion spring.

Figure 2:
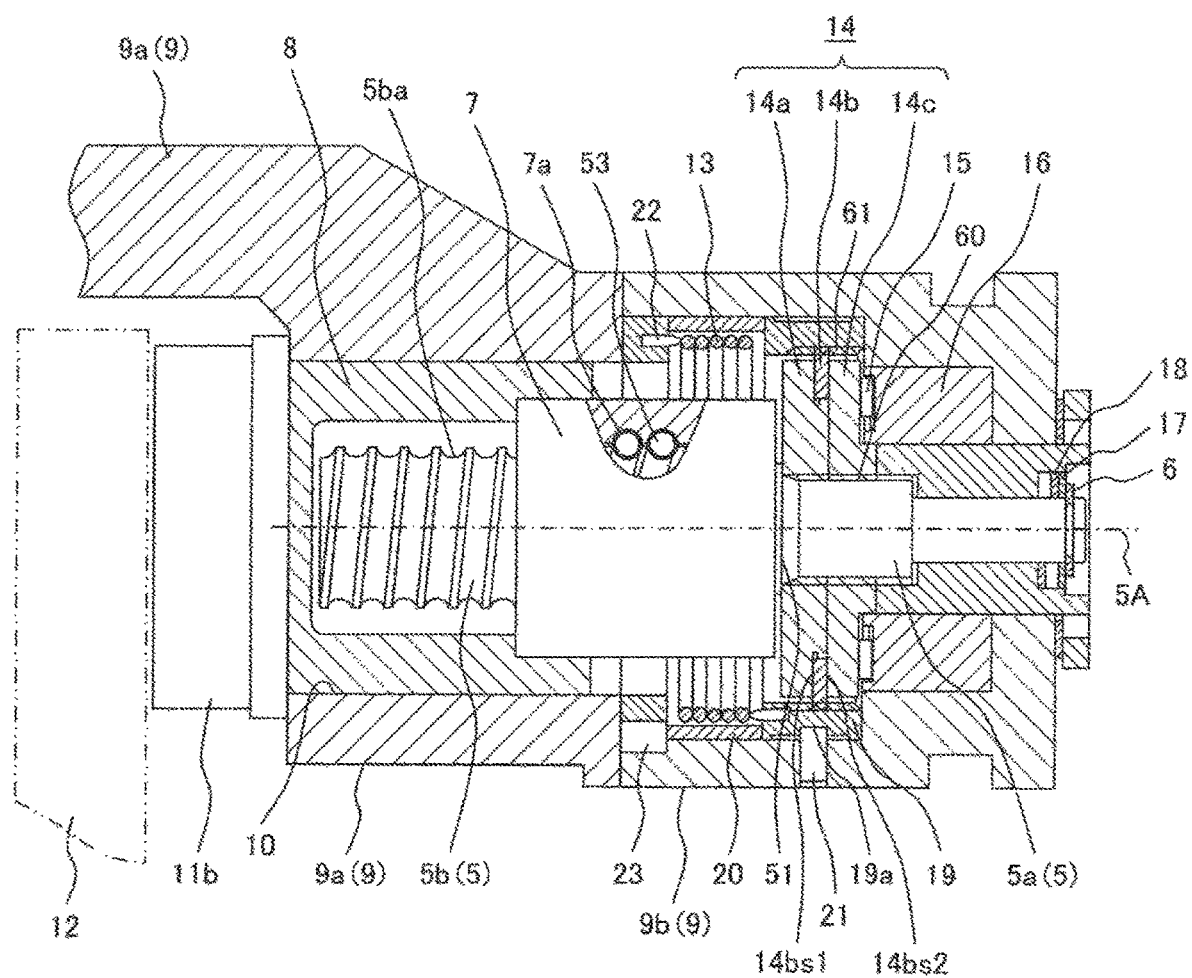
FIG. 2 is an enlarged cross-sectional view of portions of a return spring and a clutch according to the first embodiment of the present invention.

Next, the structure of the clutch 14 and the return spring 13 assembled to the spline shaft 5a of the spindle 5 will be described with reference to FIG. 2. FIG. 2 is an enlarged cross-sectional view of portions of the return spring and clutch according to the first embodiment of the present invention.

The clutch 14 makes a transition between a state in which torque for retreating the piston is storable in the return spring 13 and a state in which storage of the torque in the return spring 13 is deterred.

The clutch 14 includes a first disc 14a, a second disc 14b, and a third disc 14c. A spline 60 is provided on the outer peripheral surface of the spline shaft 5a of the spindle 5, and the first disc 14a and the third disc 14c are splined to the spline 60. Therefore, the first disc 14a and the third disc 14c are restricted in rotation by the spindle 5, but can move in a direction along the rotation center line 5A (hereinafter simply referred to as an axial direction). The second disc 14b is sandwiched between the first disc 14a and the third disc 14c.

As described above, the first disc 14a and the third disc 14c are arranged side by side along the rotation center line 5A of the spindle 5 (rotary member) and rotate together with the spindle 5. The second disc 14b has a first facing surface 14bs1 facing the first disc 14a and a second facing surface 14bs2 facing the third disc 14c, and is disposed between the first disc 14a and the third disc 14c.

In the embodiment according to the present invention, the clutch 14 transmits or blocks power by mechanical contact from the drive side to the driven side arranged concentrically with the rotation center line 5A. The drive side is the spindle 5 being a rotary member that rotates in response to the rotational motion of the reduction gear (speed reducer) 2. The driven side is the return spring 13. The first disc 14a and the third disc 14c are provided on the spindle 5 on the drive side and rotate together with the spindle 5. The second disc 14b is coupled to the return spring 13 on the driven side, twists the return spring 13 in a state where the clutch 14 can transmit power (torque), and stores torque for retreating the piston in the return spring 13.

In the embodiment according to the present invention, the clutch 14 is a disc clutch, and the shape of the portion provided with the clutch friction material (facing) (friction portion) is a disc shape. Based on the shape of the portion where the clutch friction material is provided, the first clutch member including the first friction portion of the clutch 14, the second clutch member including the second friction portion, and the third clutch member including the third friction portion are respectively referred to as the first disc 14a, the second disc 14b, and the third disc 14c, and will be described.

The first disc 14a abuts on a stepped portion 51 at the boundary between the spline shaft 5a of the spindle 5 and the screw shaft portion 5b. The first disc 14a and the spindle (rotary member) 5 include an abutting portion that transmits the reaction force from the brake disc 12 to the first disc 14a from the spindle 5, and the abutting portion includes a stepped portion 51 of the spindle 5.

The first disc 14a does not have to move in the axial direction with respect to the spindle 5, and may be a component integrated with the spindle 5. The third disc 14c has a surface on the opposite side of the side facing the first disc 14a and second disc 14b, the surface abutting on the thrust bearing 15, and is restricted in movement in the direction away from the first disc 14a and second disc 14b.

A thrust sensor 16 is disposed in a portion for catching the thrust bearing 15.

The thrust sensor 16 detects a load acting in the axial direction on the third disc 14c, and performs positioning control of the piston 8 corresponding to wear of the brake pads 11a and 11b.

A C clip 6 and a washer 17 are fixed to the end portion on the opposite side of the brake disc 12 side of the spindle 5, and the spindle 5 is pulled by the set load of the clutch spring 18 to the right side of the drawing (on the side opposite to the brake disc 12 side when viewed from the spindle 5). In the present embodiment, the clutch spring 18 includes a wave washer. The second disc 14b is sandwiched between the first disc 14a and the third disc 14c by the clutch spring 18 with a set load force in advance. That is, when the brake is not operated, the first disc 14a is in a state of being in contact with the first facing surface 14bs1 of the second disc 14b, and the third disc 14c is in a state of being in contact with the second facing surface 14bs2 of the second disc 14b.

It should be noted that the clutch spring 18 may be omitted. In that case, a slight gap is made to exist between the first disc 14a, the second disc 14b, and the third disc 14c so that the clutch 14 slips when the brake is started. When the clutch spring 18 is not used, it is necessary to provide a gap as described above, and therefore the responsiveness is worse as compared with a case where the clutch spring 18 is provided.

The outer periphery of the second disc 14b is splined to a spline 61 provided on the inner peripheral surface of the cylindrical return spring twister 19. Therefore, the return spring twister 19 is restricted in rotation by the second disc 14b. In addition, the second disc 14b can move in the axial direction with respect to the return spring twister 19. The return spring twister 19 is sandwiched between the caliper body 9 and the spacer 20, and is restricted in position in the axial direction. A groove 19a is carved in the circumferential direction in a part of the outer periphery of the return spring twister 19, and causing the pin 21 to hit the terminating end of the section where the groove 19a is formed (range in the circumferential direction) limits the range in which the return spring twister 19 can rotate.

The return spring 13 is arranged to cover the outer periphery of the nut 7.

That is, the return spring 13 is arranged on the outer peripheral side of the spindle 5 (radially outward around the rotation center line 5A with respect to the spindle 5). The nut 7 is arranged on the center side of the helix formed by the return spring 13, and a gap is provided between the return spring 13 and the outer peripheral surface of the nut 7. Thus, the return spring 13 is arranged in a non-contact state with respect to the nut 7.

One end of the return spring 13 is coupled to the return spring twister 19, and the other end of the return spring 13 is coupled to a return spring holder 22. The return spring holder 22 is inserted in a state of being restricted in rotation by the caliper body 9, and is also restricted in the position in the axial direction with respect to the caliper body 9. Thus, the return spring 13 has one end portion coupled to the second disc 14b via the return spring twister 19 and the other end coupled to the caliper body 9. Thus, the other end portion of the return spring 13 is fixed in position in the circumferential direction around the rotation center line 5A.

The caliper body 9 has a split structure, and a first body 9a provided with a cylinder 10 into which the piston 8 is inserted and a second body 9b that houses the clutch 14 and the return spring 13 are coupled with a bolt (not shown). A positioning pin 23 is provided at a portion of the second body 9b where the return spring holder 22 is inserted, and the return spring holder 22 is inserted into the second body 9b with the return spring 13 twisted by a predetermined angle. Therefore, a predetermined set torque is applied to the return spring 13.

When the brake is started, there is a gap between the brake disc 12 and the brake pads 11a and 11b. Therefore, even when the spindle 5 rotates, since the set load of the clutch 14 by the wave washer 18 is small, and the set torque of the return spring 13 is superior, the clutch 14 slips and the second disc 14b does not rotate. Therefore, the return spring 13 maintains the initial state without being twisted further from the initial state. Therefore, when the brake is started, only the spindle 5, the first disc 14a, and the third disc 14c rotate.

When the gap between the brake disc 12 and the brake pad 11 disappears, the spindle 5 is pushed in the right direction in the drawing (the direction opposite to the brake disc 12 side as viewed from the spindle 5) by the reaction force of the brake disc 12. Thus, the first disc 14a is pressed against the first facing surface (first contact surface) 14bs1 on the brake disc 12 side of the second disc 14b, the third disc 14c that receives the reaction force from the caliper body 9b is also pressed against the second facing surface (second contact surface) 14bs2 on the opposite side of the brake disc 12 side of the second disc 14b, and the second disc 14b is pushed toward the brake disc 12 (first disc 14a). Thus, the transmission torque of the clutch 14 becomes larger than the set torque of the return spring 13, and the rotation of the spindle 5 is transmitted to the second disc 14b. Furthermore, the rotation of the second disc 14b is transmitted to the return spring twister 19, the return spring 13 is twisted by the return spring twister 19, and counter torque is stored in the return spring 13. Thus, the return spring twister 19 constitutes a member that gives torsion to the return spring 13.

The electric disc brake 100 of the present embodiment can return the piston 8 with the counter torque stored in the return spring 13 at the time of failure. At the time of failure, the clutch 14 does not slip until the braking force reaches not more than a predetermined level, and the brake is released until the braking force reaches not more than an allowable level.

As described above, in the electric disc brake 100 of the present embodiment, the return spring 13 does not rotate, and the end portion connected to the second disc 14b rotates together with the spindle 5 only when the clutch 14 is engaged. Therefore, there is no unnecessary rotation of the return spring 13, and the responsiveness can be improved.

In addition, one end portion of the return spring 13 is hooked and latched on the return spring twister 19, and the other end portion is hooked and latched on the return spring holder 22. In the present embodiment, since the return spring 13 is not configured to rotate together with the rotary member (spindle 5) of the rotation linear motion conversion mechanism, even with such a simple coupling structure, the reliability of the coupling portion can be improved.

In addition, in the present embodiment, the clutch 14 is a double clutch in which the rotational force is transmitted between one end face of both end faces of the second disc 14b and the first disc 14a, and the rotational force is transmitted between the other end face of the second disc 14b and the third disc 14c. Therefore, sufficient transmission torque can be obtained even when the diameters of the discs 14a to 14c are small, and the diameter of the rotary member can be reduced.

Second Embodiment

Figure 3:
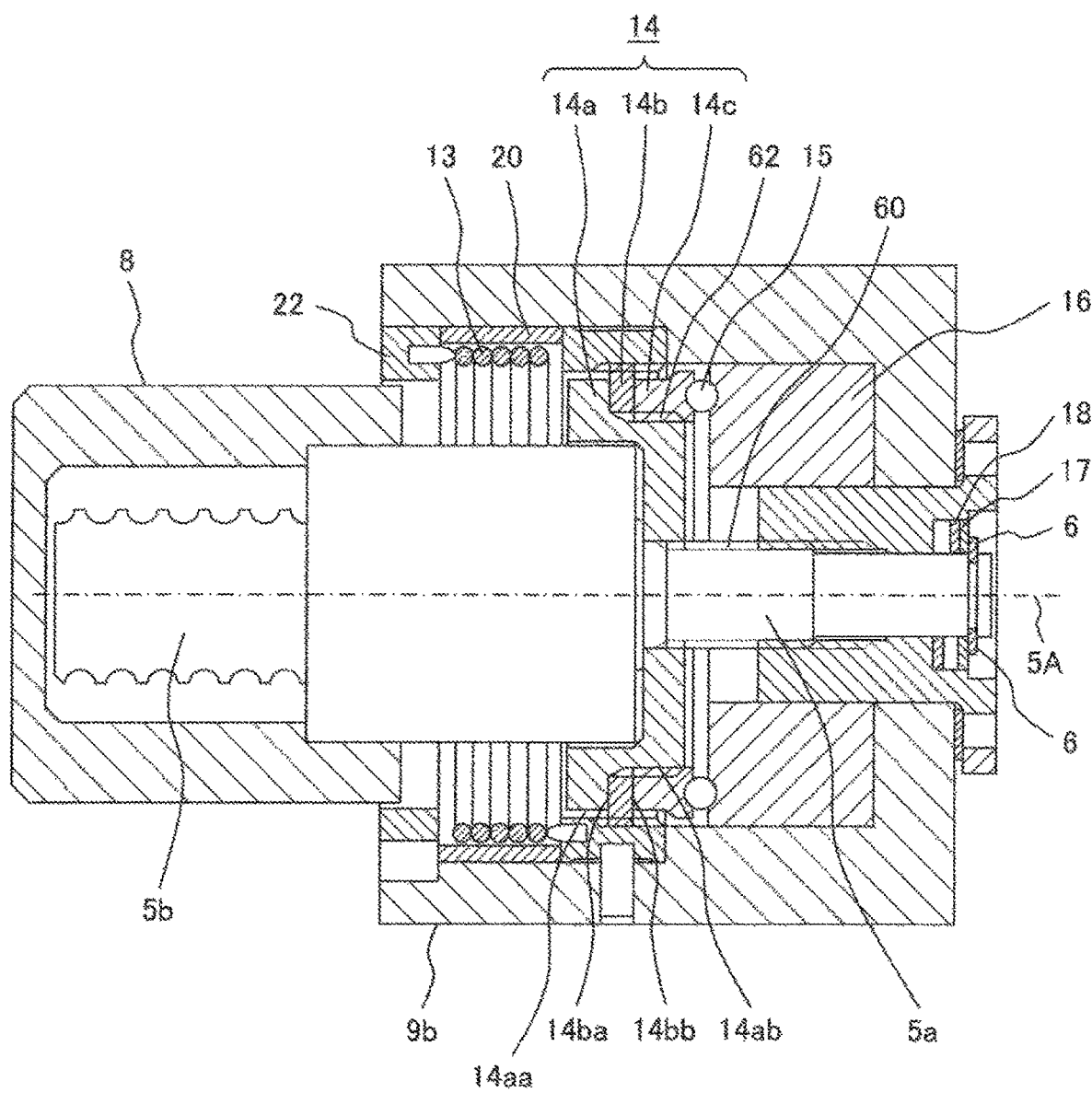
FIG. 3 is an enlarged cross-sectional view of portions of a return spring and a clutch according to a second embodiment of the present invention.

FIG. 3 is an enlarged cross-sectional view of a return spring and clutch portion according to a second embodiment of the present invention. In the present embodiment, the description will focus on the parts that are different from the first embodiment, and the same components as those in the first embodiment are denoted by the same reference numerals as in the first embodiment, and the description thereof is omitted.

The first disc 14a includes a small diameter portion 14ab and a large diameter portion 14aa, and the second disc 14b is disposed on the outer peripheral side of the small diameter portion 14ab of the first disc 14a (radially outward around the rotation center line 5A). The third disc 14c is disposed on the outer peripheral side of the small diameter portion 14ab of the first disc 14a and is disposed on the opposite side of the large diameter portion 14aa side of the first disc 14a via the second disc 14b. That is, the second disc 14b and the third disc 14c are disposed radially outward around the rotation center line 5A of the spindle 5 with respect to the small diameter portion 14ab of the first disc 14a. The second disc 14b has one end face 14ba on the brake disc 12 side facing the large diameter portion 14aa of the first disc 14a and the other end face 14bb on the opposite side of the brake disc 12 side facing the third disc 14c.

The first disc 14a is splined to a spline 60 provided on the outer peripheral surface of the spline shaft 5a of the spindle 5, is restricted in rotation by the spindle 5, but can move in the axial direction. A spline 62 is cut on the outer periphery of the small diameter portion 14ab of the first disc 14a, and the third disc 14c is splined to the spline 62 of the first disc 14a. Therefore, the third disc 14c is restricted in rotation by the first disc 14a, but can move in the axial direction. The back surface of the third disc 14c is supported by the thrust sensor 16 via the thrust bearing 15.

When a braking force is generated and a reaction force from the brake disc 12 (not shown in FIG. 3) (see FIG. 2) is transmitted to the piston 8, the first facing surface 14bs1 of the second disc 14b comes into contact with the large diameter portion 14aa of the first disc 14a. The operation after the clutch 14 comes into contact is the same as that of the first embodiment.

As in the first embodiment, a washer 17 and a clutch spring 18 are inserted between the carrier 4 and the C clip 6 at the end portion of the spindle 5, the spindle 5 is urged by the clutch spring 18 in the right direction in the drawing, and the clutch 14 may be in a contact state from the beginning. When a braking force is generated and a reaction force from the brake disc 12 (not shown in FIG. 3) is transmitted to the piston 8, the contact force between the first facing surface 14bs1 of the second disc 14b and the large diameter portion of the first disc 14a increases, and the clutch 14 is engaged. The operation after the clutch 14 is engaged is the same as that of the first embodiment.

In the present embodiment, the first disc 14a and the second disc 14b can be disposed on the outer periphery of the nut 7, and the length dimension in the axial direction can be shortened as compared with that of the first embodiment.

Third Embodiment

Figure 4:
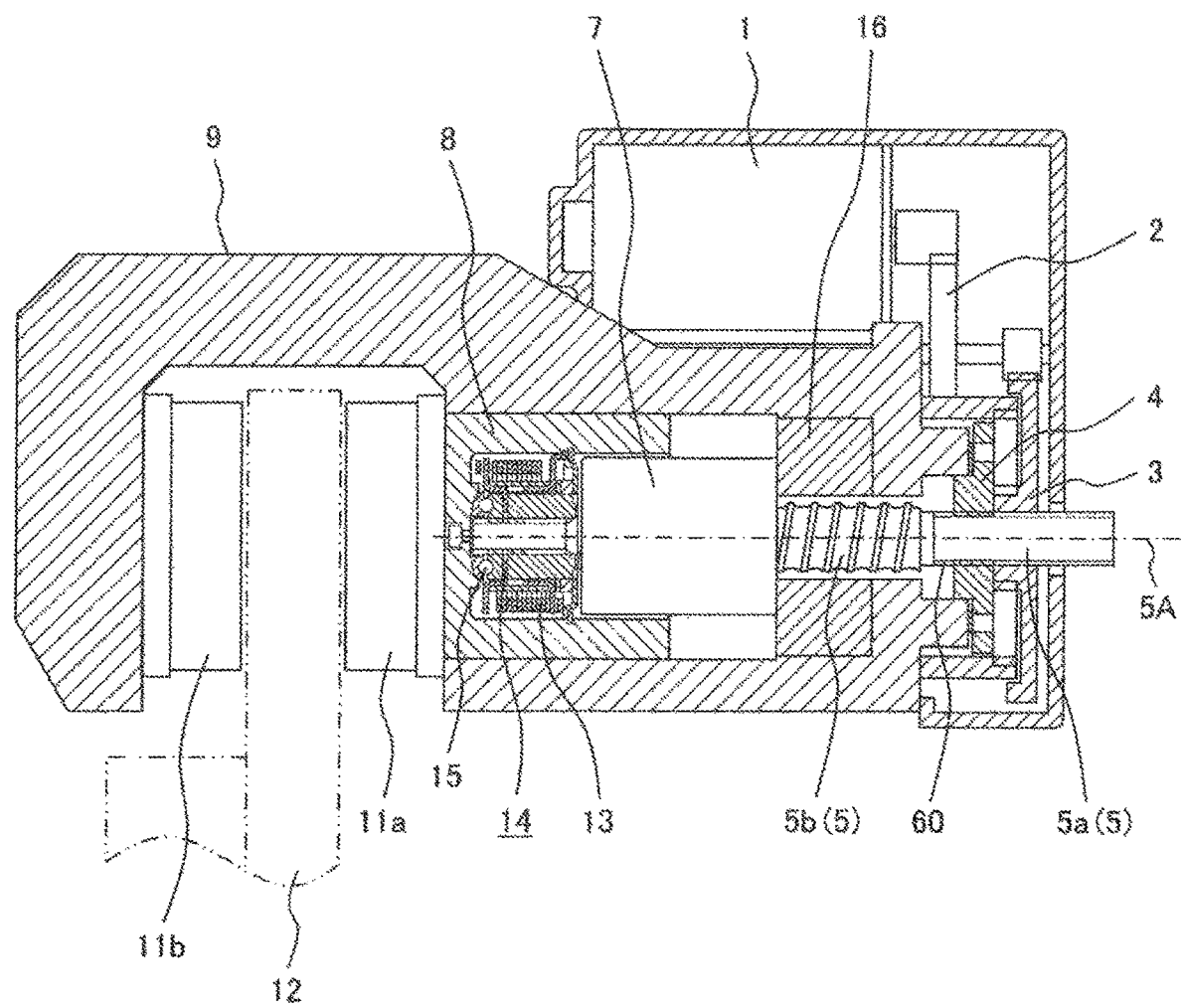
FIG. 4 is a cross-sectional view showing the structure of an electric disc brake according to a third embodiment of the present invention.

FIG. 4 is a cross-sectional view showing the structure of an electric disc brake according to a third embodiment of the present invention. In the present embodiment, the description will focus on the parts that are different from the first embodiment and second embodiment, and the same components as in the first embodiment and second embodiment are denoted by the same reference numerals as in the first embodiment and second embodiment, and the description thereof is omitted.

The first and second embodiments have a system where the nut 7 that does not rotate moves in the axial direction and pushes the piston 8, but the third embodiment has a system where the nut 7 does not move in the axial direction and the rotation direction, and the spindle 5 moves in the axial direction while rotating around the rotation center line 5A to push the piston 8.

That is, the rotation linear motion conversion mechanism of the present embodiment includes a spindle 5 for constituting a rotary member, and a nut 7 whose rotation with respect to the caliper body 9 is restricted, and the spindle 5 moves in the direction along the rotation center line 5A by its own rotation to move the piston 8 forward and backward. Thus, the return spring 13 and the clutch 14 can be arranged in the empty space inside the piston 8, and the electric disc brake can be made more compact.

As in the first embodiment, the carrier 4 of the planetary gear 3 and the spindle 5 are splined to each other, but the spindle 5 can slide with respect to the carrier 4 in the axial direction. Since the spindle 5 moves by the amount of stroke of the piston 8, the spline shaft 5a is lengthened. The nut 7 of the ball screw 5b, 7 is fixed to the caliper body 9, and the spindle 5 is configured to push the piston 8 via the thrust bearing 15 while rotating.

Figure 5:
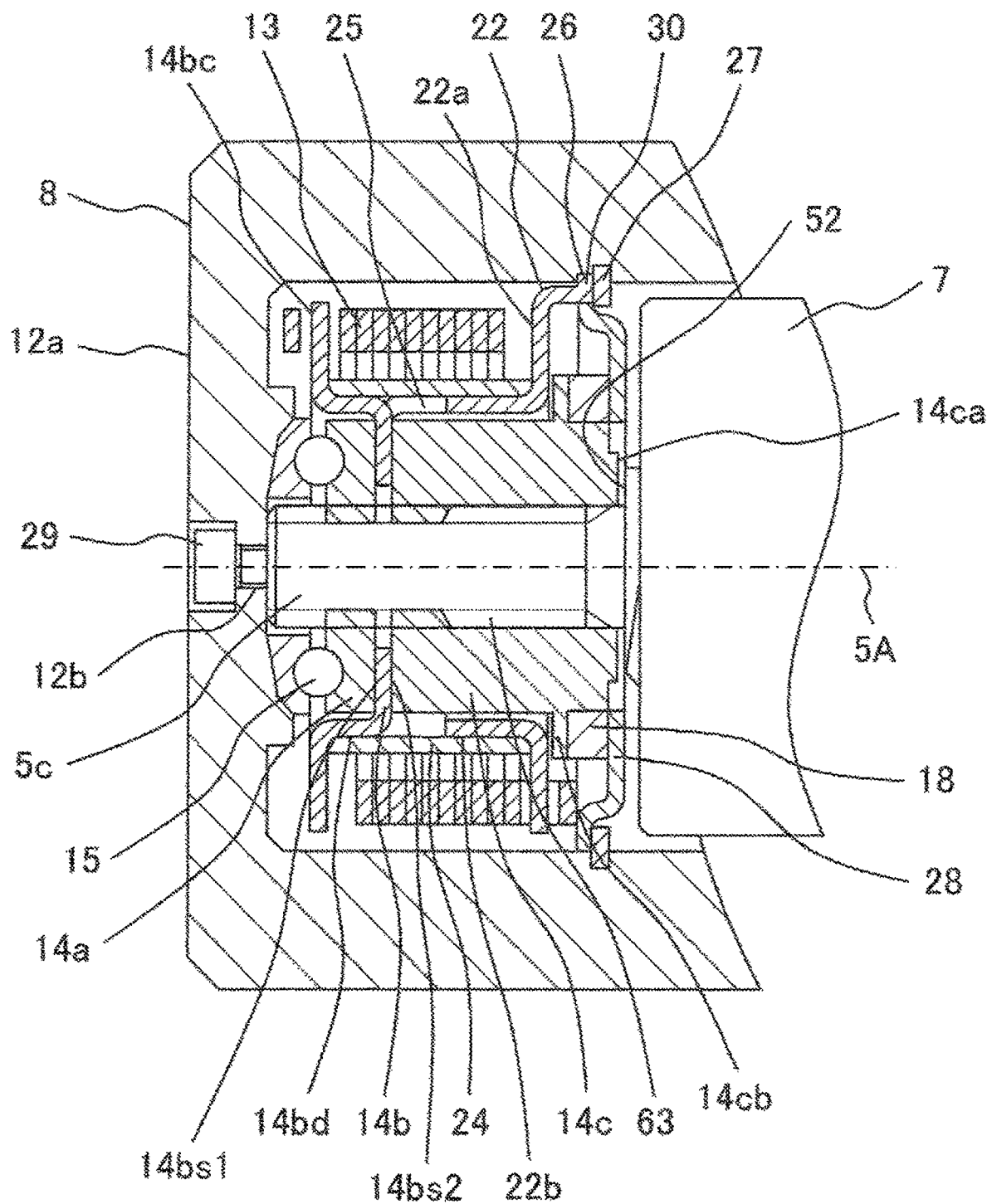
FIG. 5 is an enlarged cross-sectional view of portions of a return spring and a clutch according to the third embodiment of the present invention.

The detailed structure of the clutch 14, the clutch spring 18, and the return spring 13 arranged at the tip portion of the spindle 5 will be described with reference to the enlarged view shown in FIG. 5. FIG. 5 is an enlarged cross-sectional view of portions of the return spring and clutch according to the third embodiment of the present invention.

The clutch spring 18 is arranged on the outer peripheral side of the third disc 14c (radially outward around the rotation center line 5A) so as to surround the outer periphery of the spindle 5. The clutch spring 18 is a compression spring that pushes the third disc 14c toward the left (brake disc 12 side) in the drawing. Furthermore, the return spring 13 is arranged on the outer side in the radial direction.

A spline 63 is provided on the second spline shaft 5c at the tip of the spindle 5, and the first disc 14a and the third disc 14c are splined to the spline 63. That is, in the present embodiment, the spindle 5 is provided with two spline shafts of the first spline shaft 5a and second spline shaft 5c. It should be noted that the rotation center line of the first spline shaft 5a and the second spline shaft 5c coincides with the rotation center line 5A. Therefore, the first disc 14a and the third disc 14c are restricted in the rotation direction by the spindle 5, but can move freely in the axial direction.

There is a gap between the back surface of the third disc 14c (the end face on the nut 7 side) 14ca and the stepped portion 52 at the boundary between the second spline shaft 5c of the spindle 5 and the screw portion 5b, but when the clutch spring 18 described below is bent, this gap disappears, and the spindle 5 directly pushes the back surface 14ca of the third disc 14c. This force is transmitted to the third disc 14c, the second disc 14b, and the first disc 14a, and the first disc 14a pushes the piston 8 via the thrust bearing 15. Therefore, the first disc 14a is disposed to face the piston 8 via the thrust bearing 15 in the direction along the rotation center line 5A.

Since the second disc 14b is arranged so that the return spring 13 wraps around the thrust bearing 15, the cross section is bent and a flange portion 14bc is formed on the left side of the drawing. One end of the return spring 13 is coupled to the flange portion 14bc. That is, the flange portion 14bc is provided in a range overlapping with the thrust bearing 15 in the direction along the rotation center line 5A. In addition, one end portion of the return spring 13 is provided in a range overlapping with the thrust bearing 15 in the direction along the rotation center line 5A. The cross section of the return spring holder 22 is also bent, and the other end of the return spring 13 is coupled to the flange portion 22a.

In the present embodiment, the first disc 14a also serves as a race of the thrust bearing 15 including a ball bearing. Thus, the number of components can be reduced, and miniaturization in the direction along the rotation center line 5A can be achieved.

The return spring holder 22 fits the claw 26 into the groove 30 of the piston 8 to be fixed by the C clip 27 so as not to rotate with respect to the piston 8.

The piston 8 is inserted into the cylinder 10 of the caliper body 9 so as not to rotate.

A cylindrical surface 14bd formed by bending the second disc 14b is covered with a sleeve 24, and the radial position around the rotation center line 5A is restricted so as to be concentric with the cylindrical surface 22b of the return spring holder 22. Each of the cylindrical surface 14bd of the second disc 14b and the cylindrical surface 22b of the return spring holder 22 has a claw 25 thereon, and the second disc 14b and the return spring holder 22 are attached in a state of the return spring 13 twisted. Thus, in a state of the initial helix angle being given to the return spring 13, butting the claws 25 to each other stops the return spring 13 from rotating in the twisting back direction, and set torque is given to the return spring 13.

The clutch spring holder 28 is fixed at the same position as the claw 26 of the return spring holder 22. The clutch spring 18 is sandwiched between the clutch spring holder 28 and a flange portion 14cb provided on the outer peripheral surface of the third disc 14c, and the third disc 14c is pushed in the left direction (toward the brake disc 12) in the drawing. The clutch spring 18 is bent in advance and applies a set load to the clutch 14. It should be noted that as the clutch spring 18, a coil spring or a wave washer may be used.

A female screw is cut at the tip of the spindle 5, a hole (through hole) 12b is formed in the center of the end face 12a of the piston 8 on the brake disc 12 side, and the bolt 29 is fixed. As will be described below, the bolt 29 serves as a stopper for preventing the spindle 5 from coming out of the piston 8. Therefore, a backlash (play, gap) is provided between the piston 8 and the head of the bolt 29 rather than the bolt 29 tightened and the piston 8 and spindle 5 firmly fixed.

The return spring 13 is disposed on the outer peripheral side of the second spline shaft 5c and the first to third discs 14a to 14c, whereby the present embodiment is intended to reduce the size in the direction along the rotation center 5A.

At the start of braking, since there is a gap between the brake pads 11a and 11b and the brake disc 12, the piston 8 hits the bolt 29 that prevents from coming out, and the reaction force of the clutch spring 18 acts on the first disc 14a. Therefore, the second disc 14b is sandwiched by the set load of the clutch spring 18 and its reaction force together with the third disc 14c. In this state, even if the first disc 14a and the third disc 14c rotate integrally with the spindle 5, the force sandwiching the second disc 14b is weak and the set torque of the return spring 13 is superior. Therefore, the clutch 14 slips, and the second disc 14b does not rotate.

When the braking force is generated, the reaction force of the brake disc 12 acts on the first disc 14a, so that the force sandwiching the second disc 14b increases according to the magnitude of the braking force. When the clutch 14 is engaged by a predetermined braking force, the second disc 14b rotates and the return spring 13 is twisted. Therefore, at the time of failure, the reverse torque stored in the return spring 13 is transmitted to the spindle 5 via the clutch 14, and the piston 8 is kept returned until the braking force reaches not more than the allowable level.

If the return spring 13 is directly connected to the spindle 5 without using the clutch 14, the helix angle of the return spring 13 changes according to wear of the brake pads 11a and 11b, and the torque to be stored in the return spring 13 is not stabilized. This is because when the brake pads 11a and 11b are worn, the spindle 5 rotates several times. In addition, in order to cope with large torsion, it is necessary to reduce the stress generated inside the return spring 13 by increasing the diameter of the return spring 13 or increasing the number of turns, which is disadvantageous also in dimensions. Therefore, it is preferable to provide the clutch 14 in order to keep the stored torque of the return spring 13 within an appropriate range and to make the device compact, regardless of the wear amount of brake pads 11a and 11b.

As described above, in each embodiment according to the present invention, since the return spring 13 does not rotate and the end portion connected to the second disc 14b rotates together with the spindle 5 only when the clutch 14 is engaged, there is no unnecessary rotation of the return spring 13, and responsiveness and reliability are improved. In addition, in the third embodiment according to the present invention, since the clutch 14 is a double clutch, sufficient transmission torque can be obtained even when the discs 14a to 14c are small in diameter, so that the diameter of the rotary member can be reduced, and the return spring 13 and the clutch 14 can be housed inside the piston 8.

It should be noted that the present invention is not limited to each of the embodiments described above, and includes various modifications. For example, the above-described embodiments have been described in detail for easy understanding of the present invention, and are not necessarily limited to those having all the configurations. In addition, a part of the configuration of one embodiment can be replaced with the configuration of another embodiment, and the configuration of another embodiment can be added to the configuration of one embodiment. In addition, it is possible to add, delete, and replace another configuration with respect to a part of the configuration of each of the embodiments.

REFERENCE SIGNS LIST 1 electric motor
2 reduction gear
3 planetary gear
4 carrier
5 spindle
5A rotation center line of spindle 5
6 C clip
7 nut
8 piston
9 caliper body
10 cylinder
11 brake pad
12 brake disc
13 return spring 14 clutch
15 thrust bearing
16 thrust sensor
17 washer
18 clutch spring (wave washer)
19 return spring fixing ring
20 spacer
21 pin
22 return spring holder
23 positioning pin
24 sleeve
25 claw
26 claw
27 C clip
28 clutch spring holder
29 bolt.

The invention claimed is:

1. An electric disc brake comprising:
an electric motor;
a speed reducer configured to amplify rotary torque of the electric motor;
a rotation linear motion conversion mechanism including a rotary member configured to rotate in response to rotational motion of the speed reducer, the rotation linear motion conversion mechanism configured to convert rotational motion of the rotary member into linear motion;
a caliper body including a cylinder;
a piston configured to be inserted into the cylinder, the piston configured to move forward to press a brake pad against a brake disc;
a return spring configured to store torque for retreating the piston according to rotation of a rotary member of the rotation linear motion conversion mechanism; and
a clutch configured to make a transition between a state in which the torque is able to be stored in the return spring and a state in which storage of the torque in the return spring is deterred,
wherein the clutch includes:
a first disc and a third disc arranged side by side in a direction along a rotation center line of the rotary member, the first disc and the third disc configured to rotate together with the rotary member, and
a second disc having a first facing surface facing the first disc and a second facing surface facing the third disc, the second disc disposed between the first disc and the third disc, and
wherein the return spring has one end portion coupled to the second disc and another end portion coupled to the caliper body.

2. The electric disc brake according to claim 1, wherein the return spring is disposed on an outer peripheral side of the rotary member, and a position in a circumferential direction around the rotation center line of the other end portion is fixed.

3. The electric disc brake according to claim 2,
wherein the rotation linear motion conversion mechanism includes:
a spindle configured to constitute the rotary member, and
a nut whose rotation with respect to the caliper body is restricted, and
wherein the spindle or the nut is moved in a direction along the rotation center line by rotation of the spindle to advance and retreat the piston.

4. The electric disc brake according to claim 3,
further comprising a clutch spring disposed between the rotary member and the caliper body, the clutch spring configured to urge the rotary member in a direction away from a brake disc, and
wherein when a brake is not operated, the first disc is in a state of being in contact with the first facing surface of the second disc, and the third disc is in a state of being in contact with the second facing surface of the second disc.

5. The electric disc brake according to claim 3,
wherein the first disc includes a small diameter portion and a large diameter portion, and
wherein the first facing surface and the second facing surface of the second disc are disposed on an outer peripheral side of the small diameter portion.

6. The electric disc brake according to claim 3,
wherein the first disc and the rotary member include an abutting portion configured to transmit reaction force from a brake disc to the first disc from the rotary member,
wherein reaction force from a brake disc is transmitted to the first disc via the abutting portion, and the first disc is pressed against the first facing surface of the second disc, and
wherein reaction force of a brake disc is transmitted to the third disc via the caliper body, and the third disc is pressed against the second facing surface of the second disc.

7. The electric disc brake according to claim 6,
wherein the spindle includes a first spline shaft provided on an opposite side of a side on which a brake disc is disposed with respect to the nut,
wherein the first disc and the third disc are splined to the first spline shaft, and
wherein the return spring is disposed on an outer peripheral side of the nut.

8. The electric disc brake according to claim 3,
wherein the first disc is disposed opposite to the piston via a thrust bearing in a direction along the rotation center line, reaction force from a brake disc is transmitted to the first disc via the piston, and the first disc is pressed against the first facing surface of the second disc, and
wherein reaction force of a brake disc is transmitted to the third disc via the rotary member, and the third disc is pressed against the second facing surface of the second disc.

9. The electric disc brake according to claim 8,
wherein the spindle includes a second spline shaft provided on a side on which a brake disc is disposed with respect to the nut,
wherein the first disc and the third disc are splined to the second spline shaft, and
wherein the return spring is disposed on an outer peripheral side of the second spline shaft and the first to third discs.

10. An electric disc brake comprising:
an electric motor;
a speed reducer configured to amplify rotary torque of the electric motor;
a rotation linear motion conversion mechanism including a rotary member configured to rotate in response to rotational motion of the speed reducer, the rotation linear motion conversion mechanism configured to convert rotational motion of the rotary member into linear motion;
a caliper body including a cylinder;
a piston configured to be inserted into the cylinder, the piston configured to move forward to press a brake pad against a brake disc;

a return spring configured to store torque for retreating the piston according to rotation of a rotary member of the rotation linear motion conversion mechanism; and a clutch configured to make a transition between a state in which the torque is able to be stored in the return spring and a state in which storage of the torque in the return spring is deterred, wherein the clutch includes:

a first disc and a third disc arranged side by side in a direction along a rotation center line of the rotary member, the first disc and the third disc configured to rotate together with the rotary member, and a second disc having a first facing surface facing the first disc and a second facing surface facing the third disc, the second disc disposed between the first disc and the third disc, and wherein the return spring has one end portion coupled to the second disc and another end portion coupled to a member that does not rotate with respect to the piston.

* * * * *